United States Patent
Mauchly et al.

(10) Patent No.: US 8,077,772 B2
(45) Date of Patent: Dec. 13, 2011

(54) CODING BACKGROUND BLOCKS IN VIDEO CODING THAT INCLUDES CODING AS SKIPPED

(75) Inventors: J. William Mauchly, Berwyn, PA (US); Joseph T. Friel, Ardmore, PA (US); Maurice J. Buttimer, Media, PA (US)

(73) Assignee: Cisco Technology, Inc., San Jose, CA (US)

( * ) Notice: Subject to any disclaimer, the term of this patent is extended or adjusted under 35 U.S.C. 154(b) by 1029 days.

(21) Appl. No.: 11/937,947

(22) Filed: Nov. 9, 2007

(65) Prior Publication Data

US 2009/0122867 A1 May 14, 2009

(51) Int. Cl.
*H04B 1/66* (2006.01)
*H04N 7/12* (2006.01)

(52) U.S. Cl. .......... 375/240.01; 375/240.03; 375/240.16

(58) Field of Classification Search .................. None
See application file for complete search history.

(56) References Cited

U.S. PATENT DOCUMENTS

| | | | | |
|---|---|---|---|---|
| 6,167,162 | A | 12/2000 | Jacquin et al. | 382/251 |
| 2007/0140337 | A1 | 6/2007 | Lim et al. | 375/240.12 |
| 2007/0217500 | A1* | 9/2007 | Gao et al. | 375/240.01 |
| 2008/0212677 | A1* | 9/2008 | Chen et al. | 375/240.16 |

OTHER PUBLICATIONS

I.E.G. Richardson, M. Bystrom, and Y. Zhao, "Fast H.264 Skip Mode Selection Using an Estimation Framework", Picture Coding Symposium, (Beijing, China), Apr. 2006. Retrieved on Nov. 2, 2007 at www.rgu.ac.uk/files/richardson_fast_skip_estimation_pcs06.pdf.

C.S. Kannangara, I.E.G.Richardson, M. Bystrom, J.Solera, Y. Zhao, A. MacLennan and R. Cooney: "Complexity Reduction of H.264 Using Lagrange Multiplier Methods", IEE Int. Conf. on Visual Information Engineering, Apr. 2005. Retrieved Nov. 2, 2007 at www.rgu.ac.uk/files/h264_complexity_kannangara.pdf.

C.S. Kannangara, I.E.G. Richardson, M. Bystrom, J. Solera, Y. Zhao, A. MacLennan, R. Cooney, "Low Complexity Skip Prediction for H.264 through Lagrangian Cost Estimation", IEEE Transactions on Circuits and Systems for Video Technology, vol. 16, No. 2, pp. 202-208, Feb. 2006.

Minqiang Jiang; Nam Ling: "On Lagrange multiplier and quantizer adjustment for H.264 frame-layer video rate control", IEEE Transactions on Circuits and Systems for Video Technology,vol. 16, Issue 5, May 2006, pp. 663-669.

Kim, Y.-H. Yoo, J.-W. Lee, S.-W. Shin, J. Paik, J. Jung, H.-K., Adaptive mode decision for H.264 encoder, Electronics Letters, vol. 40, Issue: 19, pp. 1172-1173, Sep. 2004.

S.T.C. Beesley, A.J. Armstrong, C. Grecos, and D.J. Parish: "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0.

(Continued)

*Primary Examiner* — Chirag Shah
*Assistant Examiner* — Salvador E Rivas
(74) *Attorney, Agent, or Firm* — Dov Rosenfeld; Inventek

(57) ABSTRACT

A method, an apparatus, and a method to encode a block in a picture of a time sequence of pictures such as video. The method includes selecting the mode for coding the block, one of the modes being to code the block as skipped. The method further includes limiting the number of consecutive times a particular block is coded as skipped without re-setting the quantization level to a relatively fine level of quantization and re-selecting the mode.

20 Claims, 8 Drawing Sheets

OTHER PUBLICATIONS

Xiaokang Yang, Yongmin Tan, and Nam Ling: Rate Control for H.264 with Two-Step Quantization Parameter Determination but Single-Pass Encoding, EURASIP Journal on Applied Signal Processing, 2006.

PixelTools "Rate Control and H.264: H.264 rate control algorithm dynamically adjusts encoder parameters," retrieved Feb. 1, 2007 at http://www.pixeltools.com/rate_control_paper.html.

Gary J. Sullivan, and Thomas Wiegand: "Video Compression—From Concepts to the H.264/AVC Standard," Proceedings IEEE, vol. 93, No. 1, Jan. 2005.

P. H. Westerink, R. Rajagopalan, C. A. Gonzales: "Two-pass MPEG-2 variable-bitrate encoding," IBM J. Res. Develop., vol. 43, No. 4 Jul. 1999.

Jun Xin, Anthony Vetro and Huifang Sun: "Efficient macroblock coding-mode decision for H.264/AVC video coding," Technical Report MERL 2004-079, Mitsubishi Electric Research Laboratories, Jan. 2004, Retrieved Nov. 2, 2007 at www.merl.com/publications/TR2004-079/.

T. Wiegand and Michael Lightstone and T. G. Campbell and Sanjit K. Mitra: "Efficient mode selection for block-based motion compensated video coding", Proceedings, 2005 International Conference on Image Processing ICIP 2005, pp. 2559-2562, 1995, Retrieved Nov. 3, 2007 from citeseer.ist.psu.edu/wiegand95efficient.html.

T. Wiegand, M. Lightstone, D. Mukherjee, T. G. Campbell, and S. K. Mitra, "Rate-distortion optimized mode selection for very low bit rate video coding and the emerging H.263 standard," IEEE Trans. Circuits Syst. Video Technol., vol. 6, No. 2, pp. 182-190, Apr. 1996.

* cited by examiner

```
FOR each macroblock i:
    QP=Rate_control_quant
    determine cost_select for non-intra mode, zero-coded motion vector
    IF (smallness_criterion) (mode=SKIP, stop.)
    DO motion estimation and determine cost_select for non-intra mode.
    IF cost_select < threshold,
            (use non-intra mode with motion estimation, stop.)
    determine cost_select for 16x16 Intra.
    determine cost_select for 4x4 Intra.
    Pick as mode for the macroblock the minimum cost mode.
```

FIG. 4

```
FOR each frame
    C = mod(C+1, num_columns) // update which macroblocks are candidates
    FOR each macroblock i
      QP=Rate_control_quant
      determine cost_select for non-intra mode, zero-coded motion vector
      IF ((zero-coded motion vector) AND (residual coeffs. small enough))
          IF ((skipcount( i ) >= 20) AND (column == C)) // time to re-set?
             QP = 12
             skipcount( i ) = 0
             Determine cost_select for non-intra mode, zero-coded motion vector
             IF ((zero-coded motion vector) AND (residual coeffs. small enough))
                 mode=SKIP
                 STOP
          ELSE
             increment skipcount(i)
             mode=SKIP
             STOP
      ELSE
          skipcount( i ) = 0 // not skip
       do motion estimation and determine cost_select for non-intra mode.
       determine cost_select for 16x16 Intra
       determine cost_select for 4x4 Intra
       Pick as mode for the macroblock the minimum cost_select mode.
```

FIG. 6A

```
FOR each frame
    C = mod(C+1, num_columns) // update which macroblocks are candidates
    FOR each macroblock i
      QP=Rate_control_quant
      IF ((skipcount( i ) >= 20) AND (column == C)) // time to re-set?
        QP = 12
        skipcount( i ) = 0
      determine cost_select for non-intra mode, zero-coded motion vector
      IF ((zero-coded motion vector) AND (residual coeffs. small enough))
        increment skipcount(i)
        mode=SKIP
        STOP
      ELSE
        skipcount( i ) = 0 // not skip
      do motion estimation and determine cost_select for non-intra mode.
      determine cost_select for 16x16 Intra
      determine cost_select for 4x4 Intra
      Pick as mode for the macroblock the minimum cost_select mode.
```

FIG. 6B

```
FOR each frame
   C = mod(C+1, num_columns) // update which macroblocks are candidates
   FOR each macroblock i
      QP = Rate_control_quant
      IF ((skipcount( i ) >= 20) AND (column == C)) // time to re-set?
        QP = 12
        skipcount( i ) = 0
      determine cost_select for differnet modes
      pick as mode for the macroblock the minimum cost_select mode.
      IF mode == SKIP
         increment skipcount(i)
      ELSE
         skipcount( i ) = 0
```

FIG. 6C

```
FOR each frame
   C = mod(C+1, num_columns) // update which macroblocks are candidates
   FOR each macroblock i
      QP = Rate_control_quant
      // check if time to reset quant
      IF ( (NOT sweep_flag(i) AND (skipcount( i ) >= 20) AND (column == C))
        QP = 12 // reset quant
        sweep_flag(i) = TRUE
      determine cost_select for differnet modes
      pick as mode for the macroblock the minimum cost_select mode.
      IF sweep_flag(i) // if a reset quant
         IF NOT mode == SKIP
            skipcount(i) = 0
            sweep_flag(i) = FALSE
      ELSE
         IF mode == SKIP
            increment skipcount(i)
         ELSE
            skipcount( i ) = 0
```

FIG. 6D

CODING BACKGROUND BLOCKS IN VIDEO CODING THAT INCLUDES CODING AS SKIPPED

FIELD OF THE INVENTION

The present disclosure relates generally to image and video compression as used in a video encoder.

BACKGROUND

Block-based, motion compensated video compression video compression also called video encoding—is known in which each picture of a time sequence of pictures is partitioned into blocks. Examples of block-based motion compensated video compression include such transform coding methods as MPEG-1, MPEG-2, ITU-T H.261, ITU-T H.2631, ITU-T H.264/AVC, VC-1, and the Chinese AVS standards. In block-oriented motion-compensated video encoding, the content of a block is predicted by specifying a motion vector to a temporally nearby reference frame. The difference from the reference image is called the residual, and is then encoded and transmitted with the motion vector. With transform-based compression, blocks are compressed by a transform, the resulting transform coefficients are ordered along a path of increasing spatial frequency, and the transform coefficients are quantized. Different types of frames may be quantized at different levels of coarseness or fineness, defined, for example, by a quantization parameter usually denoted by QP. Furthermore, there may be several sized blocks, e.g., the chroma information in a picture may be partitioned into smaller blocks than the luma information, and motion compensation may be carried out on larger blocks than some of the other processes. By a macroblock is meant the largest sized block in the partitioning, and depending on the compression method, each macroblock may be further partitioned into smaller blocks.

Assume that motion prediction is carried out on macroblocks that may further be partitioned into blocks of image data. When the input image blocks of a time sequence are identical or almost identical, the motion vector is zero and the transmitted residuals of each of the blocks, i.e., each difference images from the reference image is close to zero as measured, for example, by a measure of the transform coefficients of the block after quantization. This type of macroblock is called "skipped" meaning that only a coding to indicate that the block is coded as skipped is used to represent the block in the compressed bitstream.

The inventors have found that distortion in a macroblock can be long-lived when the image content is created with a relatively coarse quantization, and then successive macroblocks are skipped. Skipped macroblocks may occur in situations where the background is not moving, e.g., in a videoconferencing scene with a constant background and some humans in front. With skipped macroblocks, while each skipped macroblock is an exact copy of the pixels in the reference frame, it may be that the reference frame is not an exact match of the input frame. In such a situation, a video encoder may produce a stream of images with many skipped macroblocks, but with an image quality not as good as it could be. This situation can arise, for example, when the amount of quantization varies from frame to frame or from block to block and can occur, for example, in an encoding system producing a constant-bit-rate (CBR) stream.

BRIEF DESCRIPTION OF THE DRAWINGS

FIG. 4 shows simplified pseudocode of one embodiment of a method of mode determination including ascertaining if to encode as skipped.

FIG. 6A shows simplified pseudocode for mode determination that includes a first embodiment of the present invention.

FIG. 6B shows simplified pseudocode for mode determination for an embodiment of the present invention in which the method does not check if the current macroblock is going to be coded as skipped before ascertaining whether it is a candidate for re-quantization.

FIG. 6C shows simplified pseudocode for another implementation in which the skip count for a macroblock is incremented every time a macroblock is coded as skipped.

FIG. 6D shows simplified pseudocode for an alternate embodiment in which the skip count is not necessarily incremented every time a macroblock is coded as skipped.

DESCRIPTION OF EXAMPLE EMBODIMENTS

Overview

Figure 1:
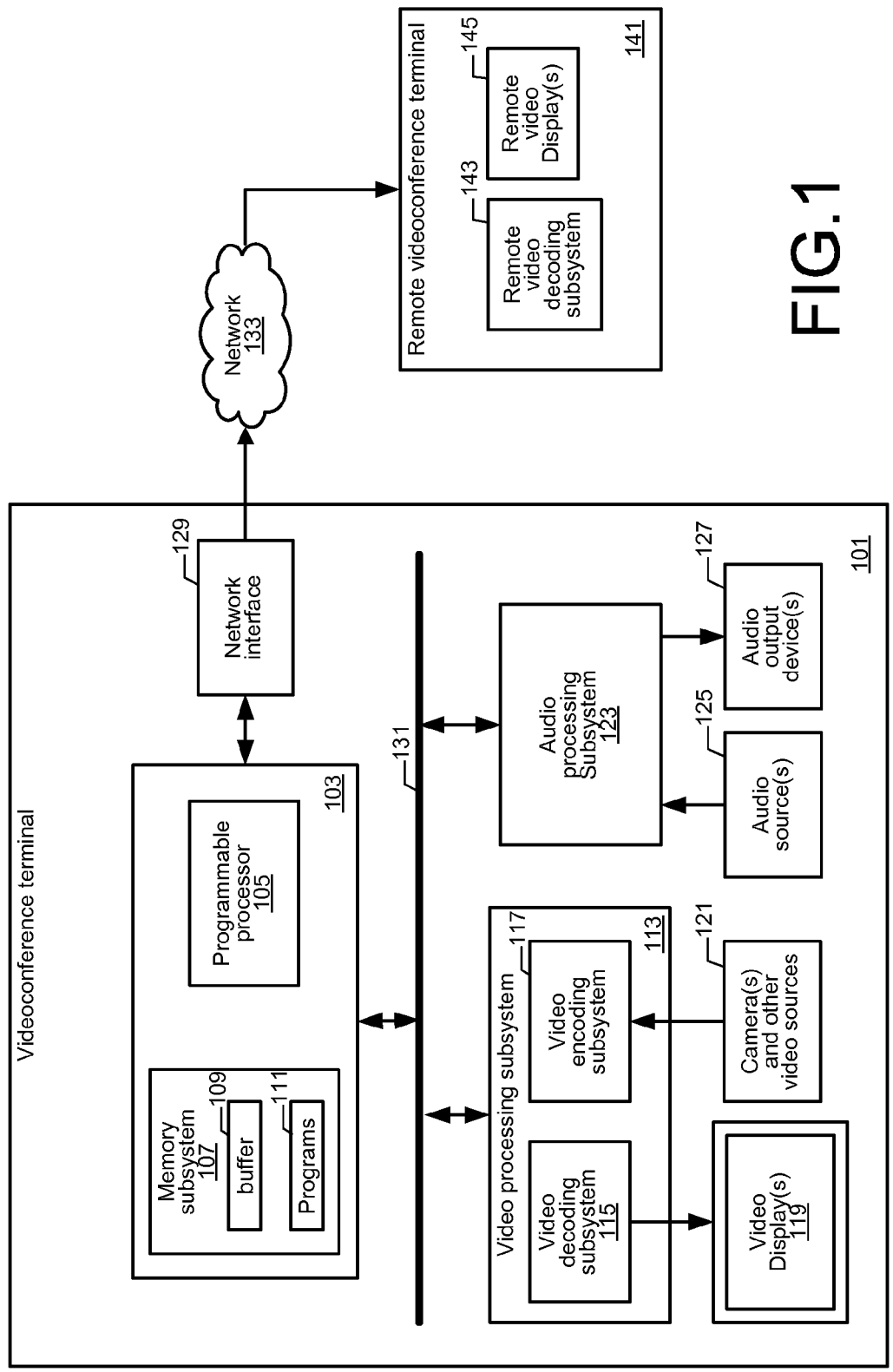
FIG. 1 shows in simplified block diagram form an embodiment of a videoconferencing system that includes an embodiment of the invention.

Embodiments of the present invention include a method, and apparatus, and logic encoded in a computer-readable tangible medium to carry out a method. The method is to limit the number of consecutive times a particular block is coded as skipped without re-setting the quantization level to a relatively fine level of quantization and re-selecting the mode.

Particular embodiments include a method operative in an encoding method that includes: partitioning a picture into blocks of pixel values; predicting the block pixel values from the pixel values of a corresponding block in one or more reference pictures, the predicting including compensating for motion according to one or more motion vector values; determining the pixel values of a residual block indicative of the difference between the block pixel values and the predicted block pixel values; transforming the residual block to form transform coefficients for the residual block; and quantizing the transform coefficients. The method operative in the encoding method includes for one or more blocks of a picture: ascertaining whether the block is a candidate for coding as skipped. The method also includes for a block that has been coded as skipped, keeping track of how long the block has been coded as skipped in successive pictures of the time sequence. The method also includes ascertaining whether or not the block is a candidate for re-quantization from a level of quantization according to a re-quantization criterion, and for one or more of the blocks that are candidates for re-quantization, re-setting the level of quantization of the blocks to a relatively fine level of quantization. The method further includes for any block that is ascertained to be a candidate for coding as skipped and whose level of quantization is not re-set, coding the block as skipped, such that after some pre-defined amount of time of being coded as skipped, the quantization level for a block coded as skipped is re-set to the relatively fine level of quantization.

Particular embodiments include a method comprising selecting the mode for coding a block in a picture of a time sequence of pictures, one of the modes being to code the block as skipped, and coding the block, such that the number of consecutive times that a particular block is coded as skipped without re-setting the level of quantization to a relatively fine level of quantization and re-selecting the mode is limited to a preselected limit. In general, the selecting of a mode is from one or more intra coding modes and one or more inter coding modes, inter coding including determining a residual image from a predicted block predicted from one or more reference images, transforming the residual image, and quantizing the transformed residual image to form quantized transform coefficients. A block coded as skipped is a block for which in inter coding, all motion vectors for the block are zero-valued and the quantized transform coefficients of the residual image are sufficiently small according to a smallness criterion.

Particular embodiments include a computer-readable medium encoding executable instructions that when executed by one or more processors of a processing system carry out a method that is in an encoding method that includes: partitioning a picture of a time sequence of pictures into blocks of pixel values; predicting the block pixel values from the pixel values of a corresponding block in one or more reference pictures, the predicting including compensating for motion according to one or more motion vector values; determining the pixel values of a residual block indicative of the difference between the block pixel values and the predicted block pixel values; transforming the residual block to form transform coefficients for the residual block; and quantizing the transform coefficients. The instructions when executed cause, for at least one block of a picture, ascertaining whether the block is a candidate for coding as skipped. The instructions when executed further cause, for a block that has been coded as skipped, keeping track of how long the block has been coded as skipped in successive pictures of the time sequence. The instructions when executed further cause ascertaining whether or not the block is a candidate for re-quantization from a level of quantization according to a re-quantization criterion. The instructions when executed further cause, for one or more of the blocks that are candidates for re-quantization, re-setting the level of quantization of the blocks to a relatively fine level of quantization; and for any block that is ascertained to be a candidate for coding as skipped and whose level of quantization is not re-set, coding the block as skipped. After some pre-defined amount of time of being coded as skipped, any block coded as skipped has the quantization level re-set to the relatively fine level of quantization.

Particular embodiments include an apparatus comprising a mode selector operative to select the mode for encoding a block of a picture of a sequence of pictures, the selecting of a mode being from one or more intra coding modes and one or more inter coding modes, inter coding including determining a residual image, transforming the residual image, and quantizing the transformed residual image to form quantized transform coefficients, the modes including a mode in which the block is coded as skipped, a block coded as skipped being a block for which in inter coding, all motion vectors for the block are zero-valued and the residual image is sufficiently small according to a smallness criterion. The apparatus further includes an encoder to code the block according to the selected mode. The mode selector is operative such that for a block that is coded as skipped and for which the ascertaining whether a block is coded as skipped was first carried out at a relatively coarse level of quantization, the number of times the block is coded as skipped with the relatively coarse level of quantization is limited to a preselected limit.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Embodiments in More Detail

The invention relates video compression methods and apparatuses that use block-based motion compensated prediction. Examples of such block-based motion compensated video compression include such transform coding methods as MPEG-1, MPEG-2, ITU-T H.261, ITU-T H.263, ITU-T H.264/AVC, VC-1, and the Chinese AVS standards. Embodiments herein will assume knowledge of and will sometimes use terminology of the H.264/AVC standard. However, the invention is not limited to using compression that conforms to these or any other standard.

FIG. 1 shows in simplified block diagram form an embodiment of a videoconferencing system 100 that includes an embodiment of the invention. The videoconferencing system provides what is currently called telepresence and immersive video conferencing in which video information is presented at relatively high definition and large size to provide a an experience for a participant as if the other, remote participant is close by. As a result of the large size and relatively high quality of the displays, relatively efficient compression is used.

At a first location, the videoconferencing system includes a first videoconferencing terminal 101 coupled via a network 133 to at least one remote videoconferencing terminals. Only one such remote videoconferencing terminal 141 is shown in FIG. 1.

The videoconferencing terminal 101 includes one or more high definition displays, e.g. of at least 700 lines of video information presented at a rate of at least 25 pictures per second, e.g., 720p which presents 720 lines at 30 or 60 pictures per second, 1080i, which presents 1080 lines at 30 pictures per second, each picture comprised of two interlaced fields, and 1080p which presents 1080 lines at 30 or 60 pictures per second. The videoconferencing terminal 121 also includes at least one camera and one or more other video sources collectively shown as 121. In the embodiment, one camera is a high definition camera. The terminal includes a video processing subsystem 113 that includes a video encoding subsystem 117 operative to encode, i.e., compress video and a video decoding 115 system operative to decode, i.e., decompress video and deliver the decoded video to one or more video displays 119. While not described in detail herein in order not to obscure the inventive features, the videoconferencing terminal 101 also includes an audio processing subsystem 123 that is coupled to and operative to accept audio signals from one or more audio sources 125, e.g., one or more microphones, and coupled to and operative to send decoded audio signals to one or more audio output devices 127, e.g., loudspeakers. The audio subsystem encodes, e.g., compresses, and decodes, e.g., decompresses audio information.

The videoconferencing terminal 101 also includes a processing system 103 that includes a programmable processor 105 and a memory subsystem 107. The memory subsystem includes programs that include computer-executable instructions that when executed by the programmable processors cause the video conferencing terminal 101 to carry out many of its functions. The processing system is coupled to the network 133 via a network interface 129 and operative to send and receive streams that include video streams and audio streams multiplexed together and that form the basis of communicating with one or more remote video terminals such as remote terminal 141. In one embodiment, the network is a packet network, and the audio and video streams are packetized.

Some of the memory subsystem 107 is operable to form one or more buffers, e.g., buffer 109 that forms a jitter buffer for packets arriving from the network.

In one embodiment, the encoding subsystem includes an encoder that includes a plurality of encoding processors operating in parallel. While the encoding subsystem 117 is shown as a separate block from the processing subsystem 103, those in the art will understand that the function of encoding is carried out by the encoder in the encoding subsystem 117 working in conjunction with the processing subsystem 103. Similarly, in one embodiment, the decoding subsystem 115 includes a decoder that includes a plurality of decoding processors operating in parallel. While the encoding subsystem 115 is shown as a separate block from the processing subsystem 103, those in the art will understand that the function of decoding is carried out by the decoder in the decoding subsystem 115 working in conjunction with the processing subsystem 103.

The various subsystems of the videoconferencing terminal 101 are coupled by a bus subsystem 131 shown for simplicity in FIG. 1 as a single bus.

Figure 2:
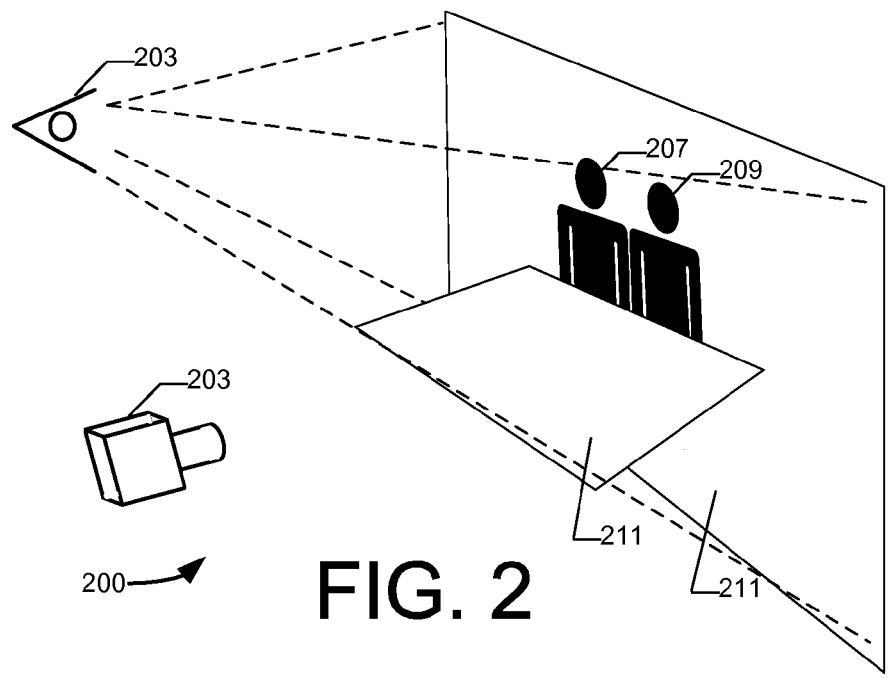
FIG. 2 shows in simplified form an example videoconferencing environment in which the first videoconferencing terminal of FIG. 1 that includes an embodiment of the present invention operates.

FIG. 2 shows in simplified form an example videoconferencing environment 200 in which the first videoconferencing terminal 101 operates. The environment 200 includes a high-definition video camera 203 in a fixed position, with fixed focus, exposure, and zoom. A source of illumination 203 provides fixed controlled illumination. Two conference participants 207, 209 are shown. The environment includes some elements such as the desk, the wall behind the participants, and so forth that form a background 301 that is fixed with respect to the camera position and lighting, i.e., that in a time sequence of frames that form the video stream from the camera 203, does not change from frame to frame.

Not shown in FIG. 2, for the sake of simplicity, are such elements as the display(s) for the participants, the microphone(s), the loudspeaker (a), the processing elements of the videoconferencing terminal 101, the network connection, and so forth.

Note that alternate embodiments multiple screens, multiple cameras, and multiple encoders in the encoding system of the terminal. The invention is not limited to any particular number of instances of cameras, and therefore encoders. The description herein will be for a single camera and single encoder for simplicity. How to modify the description to cover multiple instances would be straightforward to one of skill in the art.

Because the camera is fixed and pointed at one or more well-lit persons 207, 209 seated at a desk, in front of a blank wall or at least very stationary backdrop to form a background 211 that is fixed from frame to frame. The scene is typically low-motion, so that the resulting bitrate after compression is lower than is typical entertainment video. Nevertheless, because network bandwidth is often limited, a videoconferencing system such as system 100 shown in FIG. 1 is run at a bitrate which causes the encoding subsystem 117 to create moderate distortion in the picture.

A brief overview of encoding is provided for completeness, although it is expected that one would be familiar with encoding and the terminology described in such standards as MPEG-1, MPEG-2, ITU-T H.261, ITU-T H.263, ITU-T H.264/AVC, VC-1, and the Chinese AVS standards.

The encoding subsystem implements an encoding method that includes: partitioning a picture into blocks of pixel values; predicting the block pixel values from the pixel values of a corresponding block in a reference picture, the predicting including compensating for motion according to one or more motion vector values; determining the pixel values of a residual block indicative of the difference between the block pixel values and the predicted block pixel values; transforming the residual block to form transform coefficients for the residual block; and quantizing the transform coefficients.

In one embodiment, the encoding subsystem operates according to the ITU-T H.264/AVC standard. That does not necessarily mean that all modes and profiles are supported, but rather that the standard is substantially adhered to. For example, in one embodiment, a compliant decoder can decode the bitstream produced by the encoder.

Each frame is divided into macroblocks, e.g., 16 by 16 pixel blocks of video information. A reference frame is a frame used together with motion estimation for prediction. Each macroblock may be further divided into smaller blocks. The video information is separately encoded according to luma information related to brightness information, and chroma information related to color information. The chroma information might be subsampled at a coarser resolution than luma information to take advantage of knowledge that the human eye is less sensitive to spatial variation of color information than to spatial variation of brightness information. An intra-coded block is coded without reference to any other picture. For example, if a scene change is somehow detected, a picture typically is intra-coded, and such a picture is called an I-picture herein. A predicted block is coded with reference to one or more corresponding blocks in one or more corresponding reference pictures. As an example, the reference picture may be a decoded version of the previous picture after motion compensation. Motion compensation includes determining motion vectors to match a present block to a corresponding block in the reference picture. A residual block is the difference between the present block and the corresponding block after motion compensation in the reference picture. Encoding a predictive block includes transforming the residual block, quantizing the resulting coefficients according to a level of fineness or coarseness of quantization, ordering the transform coefficients according to a two-dimensional path, e.g., in order of increasing spatial frequency to form an ordered sequence of quantized coefficients, and coding the ordered sequence using lossless so-called entropy encoding such as CABAC (Context-based Adaptive Binary Arithmetic Coding) or CAVLC (Context-based Adaptive Variable Length Coding).

An encoded bitstream follows a syntax that defines a hierarchy. For the purpose of the example embodiment, the hierarchy includes video and audio. The video in a bitstream includes a sequence of pictures that are each composed of slices. Each slice is divided into 16 by 16 macroblocks that include luma information and chroma information. The chroma information is typically subsampled. Each slice can be encoded by intra-coding. An I slice is a slice that is coded using prediction only from decoded samples within the same slice. Inter coding of a block, macroblock, slice, or picture that uses inter prediction is called inter coding. Inter prediction is a prediction derived from one or more decoded samples of reference pictures other than the current decoded picture. A P slice is a slice that may be either decoded using intra prediction from decoded samples within the same slice, or using inter prediction from one or more previously-decoded reference pictures, using at most one motion vector and reference index that refers to a reference picture to predict the sample values of each block.

Predicted macroblocks can be of different types, and such types are defined by different parameters in the bitstream that define what is called the prediction mode. There are different prediction modes for intra-coded slices and for inter coded slices. One feature of the invention is how the encoder processes a skipped macroblock, which is a macroblock for which no data is coded other than an indication that the macroblock is to be decoded as "skipped". This indication may be common to several macroblocks.

H.264 provides 7 modes for inter (temporal) prediction, 9 modes for intra (spatial) prediction of 4×4 blocks, 4 modes for intra prediction of 16×16 macroblocks, and one skip mode. Each 16×16 macroblock can be broken down in numerous ways. In the example embodiment herein, not all these modes are used; the video information has the following characteristics and parameters:

Resolution: progressive scan 1080p or 720p, selectable by software.

Frame rate: 30 fps (frames per second).

H.264 profile: H.264 main profile with CABAC.

Intra prediction modes for I-slice macroblocks include 4×4 intra mode (Intra _4×4) and 16×16 intra mode (Intra _ 16×16).

Inter prediction modes for non I-slice macroblocks—e.g., for P-slice macroblocks include 16×16 prediction using the previous frame only.

Skip-mode is an "inferred" macroblock type—a so-called "skipped" macroblock for which no data is coded other than an indication that the macroblock is to be decoded as "skipped". In the example embodiment described herein, skip mode occurs when there is a zero-valued motion vector indicative of no motion between the corresponding block in the reference picture, and if the residual image is small enough according to a smallness criterion. In alternate embodiments, rather than a zero-valued motion vector, a more general criterion is used: a zero-coded motion vector, which is a motion vector that is zero-valued or for which no data is coded other than an indication that the motion vector is to be decoded from one or more neighboring macroblocks' motion vector(s).

Each slice is a row of macroblocks. In the encoding subsystem 117, there is a plurality of encoders that each processes one slice, such that a plurality of slices is encoded in parallel.

A group of slices is used that conforms to a group of pictures (GOP) in earlier standards such as H.263 and MPEG-2. A GOP has an I frame to start and then all P-pictures. While in one embodiment, a new GOP starts upon indication of an error, in another embodiment, feedback from a remote decoder is used to receive an indication of the exact location of an error, such that inter prediction can still be used, but with reference to a long term reference frame rather than the previous frame, such that I-frames can be avoided.

Rate control. One embodiment includes active rate control to ensure the output bitstream has a constant bitrate (CBR).

The amount of compression can be controlled amongst other things by controlling the level of quantization. In the example embodiment used herein, as in many of the coding standards, including H.264/AVC, the level of quantization for quantizing a particular quantity, e.g., luma transform coefficients of a luma residual image block, is defined by a single parameter called the quantization parameter denoted herein by QP. A smaller value of QP means finer quantization, so a higher resulting bitrate and hopefully higher quality. While a relatively high QP is indicative of a relatively coarse level of quantization resulting in a lower bitrate. I frames are typically encoded with a relatively high level of quantization.

Figure 3:
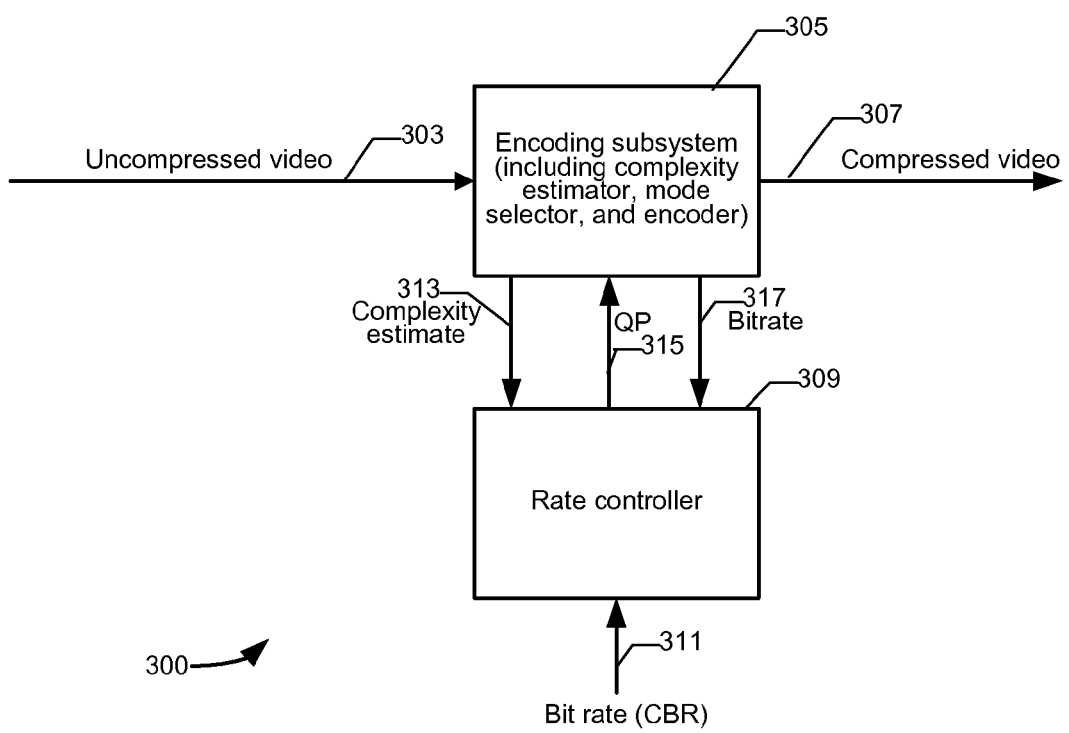
FIG. 3 shows a simplified block diagram of one example of adaptive rate control including an encoder that includes an embodiment of the present invention.

One embodiment includes an adaptive rate control process in which an estimate of the complexity of a picture or one or more macroblocks of a picture, a model of the buffers of the picture, and an indication of the bitstream, e.g., of the bitrate in the actual bitstream are used to control the QP for a macroblock. The adaptive rate control process may operate differently for different types of macroblocks. The invention described herein is not limited by the particular type of adaptive rate control process, and a detailed description of such a process is not needed to understand operation of the example embodiments. FIG. 3 shows a simplified block diagram of one example 300 of adaptive rate control including an encoder 305 that includes a complexity estimator to determine a quantity 313 as an indication of the complexity of the video being compressed. The encoder outputs a compressed bitstream. A rate controller 309 is coupled to the encoder 305 and is operative to determine a value for the quantization parameter QP 315 according to the complexity estimate 313 and an indication 317 of the bitrate of the output stream 307. See for example, the H.264/AVC standard for different methods of adaptive rate control.

In one embodiment, the rate control process is such that a QP value of at least 12 is maintained at all times, and such that a CBR is maintained for the encoded bitstream. In one embodiment, the rate control process is set up such that bitrates of 1 Mbit/sec and 2 Mbit/sec are software selectable at a resolution of 720p at 30 fps, and bitrates of 3 Mbit/sec and 4 Mbit/sec are software selectable at a resolution of 1080p at 30 fps.

One embodiment further includes active error feedback and use of a long term reference picture for error-resilience. Referring again to FIG. 1, when the decoding subsystem 143 at the remote videoconferencing terminal fails to receive a packet, or the packet arrives too late to use, there is a visual error. The decoding subsystem 143 is operative to conceal the error, but because of the inter prediction encoding, the error would nevertheless propagate into every subsequent inter coded frame if some alternate was not used. In one embodiment, wherein the remote decoding subsystem 143 is operative to send feedback to the videoconferencing terminal 101 when an error is detected at the decoding subsystem The encoding method of the videoconferencing terminal 101 is operative to encode frames using inter prediction with reference to a long-term reference frame (LTRF) rather than to intra encode a frame (an I-frame) such that relatively long sequences of frames are inter-predicted compared to not sending back the feedback from the decoder. Use of long term reference frames is known in the art. See for example, Sunil Kumar, Liyang Xu, Mrinal K. Mandal and Sethuraman Panchanathan, "Error Resiliency Schemes in H.264/AVC Standard," Elsevier J. of Visual Communication & Image Representation (Special issue on Emerging H.264/AVC Video Coding Standard), Vol. 17, No. 2, April 2006, pp. 425-450.

As a result of the active error feedback, the videoconferencing terminal 101 can run for a relatively long time without needing to send an I frame. Thus, for typical videoconferencing scenes such as described above, there can be a very long train of inter coded macroblocks of P-slices of P-frames, each referencing the previous frame.

Skip mode for a macroblock is defined as a macroblock for which no data is coded other than an indication that the macroblock is to be decoded as "skipped". Such a block is called herein a block coded as skipped. The H.264/AVC standard includes "skipped" as one of the modes for a macroblock. In one embodiment, ascertaining if a macroblock is to be coded as skipped includes ascertaining whether the one or more motion vectors for the block are zero-valued, indicative of no motion relative to the corresponding block in the reference image(s) and whether the residual image is sufficiently small according to a smallness criterion.

In short, in one embodiment, a macroblock is coded as skipped if it is non-intra predicted, has a zero-valued motion vector, and has substantially zero residual. While there is no QP value associated for decoding with a block coded as skipped, a QP value is used to ascertain whether a block should be coded skipped. In one such embodiment, the following pseudocode is used to ascertain if a block is to be skipped.

```
residual_pixels = the source_pixels – reference_pixels.
coefficients = transform(residual_pixels).
quantized_coefficients = Quant_QP(coefficients)
IF ( ( smallness_criterion(quantized_coefficients) ) AND
     (motion_vector = 0 ) ) then mode=SKIP.
```

In the pseudocode, source_pixels denotes the pixels of the present block to be coded, reference_Pixels denotes the pixels of the reference block, residual_Pixels denoted the pixels of the residual block, coefficients denotes the block of transform coefficients of the residual block, quantized_coefficients denotes the quantized coefficients of coefficients, Quant_QP denotes the quantization according to a quantization parameter denoted QP, smallness_criterion (quantized_coefficients) denotes a settable logical function of the quantized coefficients, motion_vector denotes the one or more motion vectors of the block, and SKIP denotes skip mode that is used to indicate the block is coded as skipped. In one embodiment, smallness_criterion is whether no quantized coefficient has amplitude greater than 1 and whether the number of quantized coefficients that have amplitude 1 exceeds a settable, i.e., predefined threshold. The threshold is selected to indicate substantially a zero-valued residual image after quantization. In one embodiment, the threshold is 3. Thus, if the residual results in at most a very few very small quantized coefficients, the block is encoded as a skipped block.

Encoding a macroblock in one embodiment includes mode selection, mode selection uses a cost criterion, and ascertaining whether to encode as skipped is included in the mode selection. In the embodiment described herein, mode selection is to select between the inter-mode, including the skip mode, and the two intra-modes. In alternate embodiments in which more than one inter mode is used, the mode selection selects amongst several modes.

The particular method to ascertain whether a block is coded as skipped, the smallness criterion used to ascertain if to use skip mode, and indeed the cost function used for mode selection is not meant to be limiting, and any of many mode selection methods can be used. In different embodiments, the decision to use skip mode may be made in other ways, or at other points in the mode decision process. Mode selection is known in the art using minimization of different cost functions. One embodiment uses as a cost function for mode selection a measure of the distortion and a measure of the number of bits used for the macroblock. For example, one set of cost functions uses rate distortion and Lagrangean methods. See for example T. Wiegand and Michael Lightstone and T. G. Campbell and Sanjit K. Mitra: "Efficient mode selection for block-based motion compensated video coding", Proceedings of the 2005 IEEE International Conference on Image Processing (ICIP 2005), pages 2559-2562, 1995, and T. Wiegand, M. Lightstone, D. Mukherjee, T. G. Campbell, and S. K. Mitra, "Rate-distortion optimized mode selection for very low bit rate video coding and the emerging H.263 standard," IEEE Trans. Circuits Syst. Video Technol., vol. 6, no. 2, pp. 182-190, April 1996.

FIG. 4 shows simplified pseudocode of one embodiment of a method of mode determination including ascertaining if to encode as skipped. In FIG. 4, Rate_control_quant is the value of QP determined for the macroblock by the rate control, e.g., rate control 309 of FIG. 3, cost_select indicates cost according to a mode selection cost function, threshold denotes a settable, e.g. pre-selected threshold, and SKIP denotes skip mode.

It is accepted practice in the art to "encourage" skip mode because it is very efficient from a rate-distortion trade-off point-of-view. The result of such practice is to "promote" a block to skip mode even if there is moderate distortion in the block. Therefore, once a block that does not change over time from picture to picture is first encoded as skipped, it is likely to continue being encoded as skipped. If the first mode decision that decides on coding as skipped is made using relatively coarse quantization, relatively low quality might persist, e.g., for a background part of an image for some time. One feature of the invention is that the quality of such a background part does not persist for too long a time. The number of frames for which a block is coded as skipped according to a first-used relatively coarse level of quantization is limited.

Figure 5:
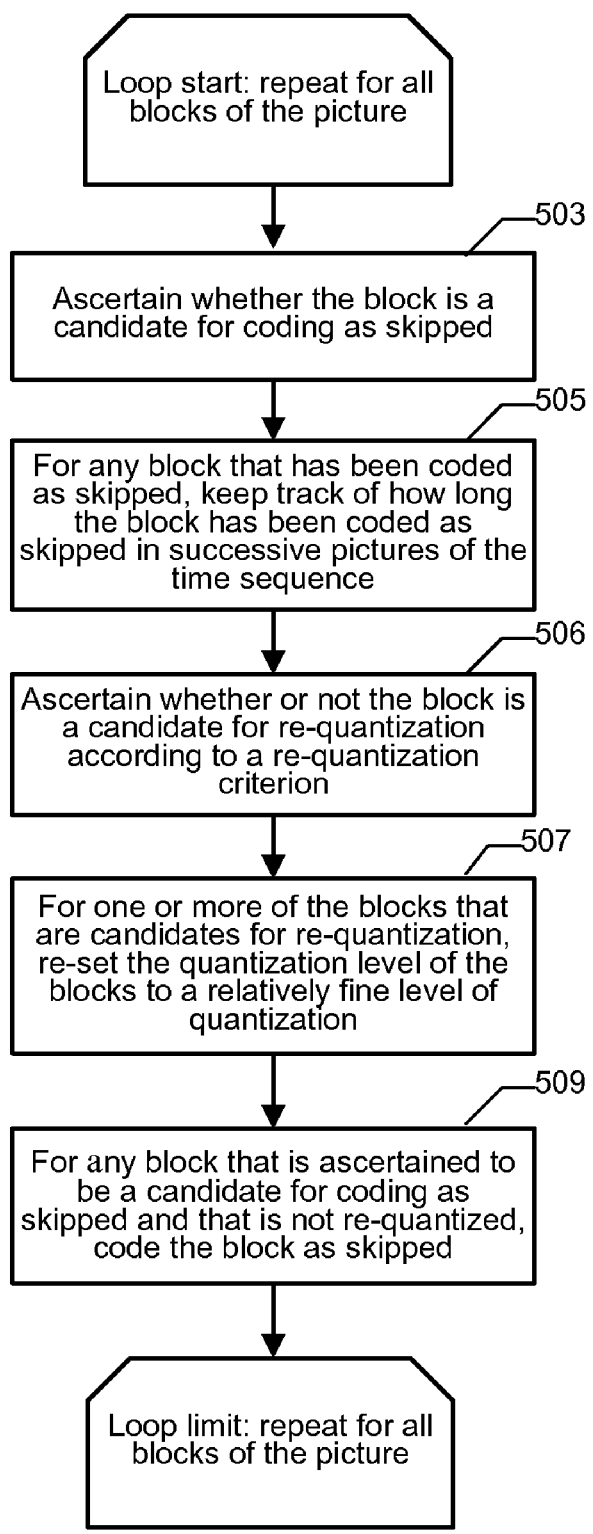
FIG. 5 shows a simplified flowchart of one method that includes an embodiment of the invention.

FIG. 5 shows a simplified flowchart of one method that includes an embodiment of the invention. The method includes for at least one block of a picture, in 503 ascertaining whether the block is a candidate for coding as skipped. The method further includes in 505, for any block that has been coded as skipped, keeping track of how long the block has been coded as skipped in successive pictures of the time sequence. In 506, the method includes ascertaining whether or not the block is a candidate for re-quantization from a level of quantization according to a re-quantization criterion. The method further includes in 507 for one or more of the blocks that are candidates for re-quantization, re-setting the level of quantization of the blocks to a relatively fine level of quantization. The method further includes in 509 for any block that is ascertained to be a candidate for coding as skipped and that is not re-quantized, coding the block as skipped, such that after some pre-defined amount of time of being coded as skipped, any block coded as skipped is re-quantized with the relatively fine level of quantization.

Using such an embodiment may improve the quality of blocks that do not change over time that are first encoded as skipped using relatively coarse quantization.

In one embodiment applicable to H.264 using the parameters described hereinabove, the relatively fine level of quantization includes setting QP to 12. Without using the re-setting of quantization as described herein, for a typical scene typically, for the parameters described above, when there is moderate motion, the QP varies between 20 and 30 due to the constant bitrate constraint and the adaptive rate control.

One embodiment includes 506 only in the case the block also is ascertained to be a candidate for coding as skipped, and another embodiment independent of the ascertaining of candidacy for coding as skipped.

As described above, in one embodiment, the ascertaining whether the block is a candidate for coding as skipped includes ascertaining whether the motion vectors for the block are zero-valued and whether the residual image is sufficiently small according to a smallness criterion.

In one embodiment, the overall smallness criterion includes carrying out an analysis first in the pixel domain using a pixel domain smallness criterion, then if the pixel domain smallness criterion is not met, carrying out in the frequency domain analysis according to a frequency domain smallness criterion.

In one such embodiment, the smallness criterion includes that the residual average pixel level is under a first pre-defined (and settable) threshold and the residual peak pixel level is under a second pre-defined (and settable) threshold, then TRUE, otherwise transform residual image to frequency domain, quantize the transform coefficients, determine if (smallness_criterion (quantized_coefficients) is TRUE, and of the smallness criterion of the quantized coefficients indicates a very small number of very small non-zero quantized coefficients, then the overall smallness criterion is ascertained to be TRUE. One example of smallness_criterion (quantized_coefficients) is whether no quantized coefficient has amplitude greater than 1 and whether the number of quantized coefficients that have amplitude 1 exceeds a settable, i.e., predefined threshold. The threshold is selected to indicate substantially a zero-valued residual image after quantization. In one embodiment, the threshold is 3. Another embodiment further takes into account the nearness of the non-zero-valued coefficients, e.g., whether they are consecutive or scattered. Another embodiment further takes into account the frequency index of the non-zero coefficients, e.g., where in the ordered series of quantized coefficients the non-zero-valued coefficients are.

Thus in one embodiment, ascertaining whether the quantized image is sufficiently small includes comparing one or more pre-defined functions of the residual image to one or more pre-defined thresholds.

In one embodiment, for a particular block, the keeping track of the amount of time a block has been coded as skipped includes maintaining a count of the number of pictures for which the block has been coded as skipped. In such an embodiment, the re-quantization criterion for the particular block is that the block has been skipped for at least a pre-determined number of pictures. For the particular example embodiment described hereinabove, the pre-determined number of pictures is 20, so that a block is a candidate for re-quantization after it has been coded as skipped for at least 20 frames.

When a block is re-quantized, it might no longer be encoded as skipped because some or many of the transform coefficients that were previously quantized to zero might now no longer be zero. Such a block that is re-quantized to the relatively fine level of quantization for the first time might then use a relatively large number of bits. In a low bitrate system with constant bitrate, this might cause an overflow of one or more buffers if many blocks were re-quantized in the same frame. Furthermore, if many of the blocks were re-quantized in the same frame, there might be a sudden perceptible change in the decoded sequence of frames when played back and viewed.

In one embodiment, for any picture, in step 507, at most a pre-determined number of blocks that are coded as skipped are re-quantized. This can be, for example, because at most a predetermined number of blocks are tested as candidates for re-quantization, or that step 507 includes limiting the number of blocks that are re-quantized.

One effect so limiting the number of blocks that are re-quantized is that overflow is less likely. Furthermore, the likelihood of a perceptible "sudden" change in the played back and viewed sequence of decoded frames is less likely.

There are many possible methods to limit the number of blocks that are candidates for re-quantization. In one embodiment, at most a pre-determined number of blocks that are coded as skipped are candidates for re-quantization. For example, in one embodiment, for any picture, at most a pre-determined number of blocks that are coded as skipped are candidates for re-quantization. For example, in one embodiment, for any picture, at most a pre-determined percentage of the picture can be made up of blocks that are coded as skipped and that are candidates for re-quantization.

One particular embodiment includes the feature that for any picture, the ascertaining of whether the block is a candidate for coding as skipped ascertains only blocks that are in one or more particular columns of the picture. One version limits such blocks to being in one column of the frame.

Denote a frame number by N, starting with the first column, and denote the column number by C, in one embodiment, only the blocks in column C are be tested for possible re-quantization. C is incremented for each successive frame, modulo the number of columns in a frame, denoted num_columns.

FIG. 6A shows simplified pseudocode for mode determination that includes a first embodiment of the present invention. In FIG. 6A, skipcount (i) denotes a count maintained for macroblock denoted i that is being coded as skipped. QP is the quantization parameter. Other quantities are as described above.

In one embodiment, ascertaining whether to subject the block to re-quantization is separate from ascertaining whether to code as skipped.

FIG. 6B shows simplified pseudocode for mode determination for an embodiment in which, for convenience, the method does not check if the current macroblock is going to be coded as skipped before ascertaining whether it is a candidate for re-quantization. This does lead to some non-stationary macroblocks inadvertently being re-quantized to the relatively fine level of quantization (QP=12). However, the inventors have found that this is relatively rare in the high-definition videoconferencing situation with the parameters defined herein.

Note that in the implementations of FIGS. 6A and 6B, the skip count for a macroblock is incremented every time a macroblock is coded as skipped. FIG. 6C shows simplified pseudocode for another implementation in which the skip count for a macroblock is incremented every time a macroblock is coded as skipped.

FIG. 6D shows simplified pseudocode for a slightly different implementation that the inventors have found is less susceptible to noise for the type of image sequences encountered in the high definition videoconferencing example. In such an alternate embodiment, the skip count is not necessarily incremented every time a macroblock is coded as skipped. If the current macroblock is having the QP re-set, e.g., to QP=12, the method sets a flag denoted sweepflag (i) to isolate the current macroblock from the skip_count logic until the macroblock becomes non-skipped due to non-stationary block content. In the case the flag is set, the method does not re-set the skipcount to 0 and does not increment skipcount for co-located respective macroblocks in respective subsequent frames.

One embodiment operates in a system that includes error feedback. Referring to FIG. 1, suppose the encoding subsystem 117 is operative to produce a bitstream that is sent to a remote decoder in a remote decoding system 143, e.g., in a remote videoconferencing terminal 141, and suppose that the remote decoding system 143 is operative to send feedback to the encoding subsystem 117 when an error is detected at the remote decoding system 143. This might occur, for example, in the case that the remote decoding system 143 fails to receive video information, e.g., a packet, or the video information arrives too late to use for decoding. This could results in a visual error at the remote videoconferencing system 143. The remote decoding system 143 might include a method of "concealing" such an error in the display. The error however could still propagate into every subsequent P-frame. Thus remote decoding system 143 is operative to send feedback to the encoding subsystem 117 when an error occurs.

In response, the encoding system 117 encoding new frames in such a way as to correct the error. One method would be to send an I-frame. An improved method sends inter coded frames that do not reference the recent reference frame(s) that might be erroneously received at the remote decoding system.

Thus, suppose further that the encoding subsystem 117 is operative to encode frames using inter prediction with reference to a long-term reference frame rather than a recent frame to encode a frame such that relatively long sequences of frames are inter-predicted compared to not sending back the feedback from the decoder.

An embodiment of the method described herein of determining whether a macroblock is to be coded as skipped and ascertaining whether or not a macroblock coded as skipped is a candidate for re-quantization can be included in such a method that includes use of a long term reference frame.

In general, some embodiments of the invention operate with all methods of so-called early skip detection in which the skip detection can be made independent of, e.g., earlier than the mode selection, i.e., the determination of which mode to use for coding.

Other embodiments of the invention include making the ascertaining of whether to use skip mode as part of the mode selection for the macroblock, and not necessarily independent of the mode selection. In one such embodiment, skip mode determination is made after all other mode decisions have been tried and the resulting mode is a non-intra coded mode with zero-valued motion vector and a residual image that is sufficiently small.

One embodiment includes either look-ahead or two-step encoding, such that the ascertaining of whether a block is a candidate for coding as skipped occurs ahead of and does not require the encoding of the block. One such alternate embodiment of the invention is usable in an encoding system that has multiple passes. Another has a look-ahead feature that carries out preliminary mode selection for blocks of a frame ahead of the encoding of the macroblocks of the frame. One example of a method of ascertaining whether or not a block is to be skipped without requiring coding of the block is described in C. S. Kannangara, I. E. G. Richardson, M. Bystrom, J. Solera, Y. Zhao, A. MacLennan, R. Cooney, "Low Complexity Skip Prediction for H.264 through Lagrangian Cost Estimation", IEEE Transactions on Circuits and Systems for Video Technology, vol. 16, no. 2, pp. 202-208, February 2006, hereinafter called "the Kannangara method." Another method is described in I. E. G. Richardson, M. Bystrom, and Y. Zhao, "Fast H.264 Skip Mode Selection Using an Estimation Framework", Picture Coding Symposium, (Beijing, China), April 2006. In the Kannangara method, a measure of distortion between a current macroblock and the motion-compensated MB from the reference picture with zero displacement from the motion vector is used. The distortion measure is selected to be the mean-squared error (MSE) and may be calculated prior to coding the current macroblock, in that its calculation does not depend on any outputs of the coding process. In the Kannangara method, a measure of the rate-distortion costs of coding or skipping an MB are determined prior to processing of a macroblock, and a decision is made whether to code the macroblock or to code as skipped based on a Lagrangian cost function. As is commonly known, for a nonincreasing convex rate-distortion function, the Lagrangian parameter is the (negative) derivative of distortion with respect to rate. The Kannangara method includes using a model for the Lagrangean parameter based on the complexity measure for the current macroblock—sometimes called an activity measure—and the quantization parameter. For every MB, the method includes calculating and reading previously stored values of the distortion and rate, determining a complexity measure for the current macroblock, calculating the Lagrangean parameter using the model for the Lagrangean parameter, and selecting whether or not to code as skipped based on a cost measure that depends on the Lagrangean parameter, the rate, and the distortion. This is carried out prior to encoding of the macroblock, i.e., ahead of time.

Other methods also are known that include determining a Lagrangean parameter for a cost function for mode selection prior to encoding a current macroblock.

One alternate embodiment that includes ascertaining which macroblocks are possible candidates for coding as skipped ahead of and without coding the current macroblock includes determining a Lagrangean parameter for a cost function for mode selection prior to encoding a current macroblock, and using such a cost function to ascertain, ahead of processing a macroblock, whether the macro-block is a candidate for being coded as skipped.

One embodiment applicable to a two-pass encoder includes maintaining statistics, e.g., runlengths on macroblocks that are encoded as skipped. A skip run is a block in a certain location of the picture which is coded as skipped for successive frames. The same block in the frame preceding each run is be called an "anchor block," herein. Typically, an anchor block is not coded as skipped. One version of the alternate embodiment includes assigning relatively finer quantization, e.g., a lower QP than for non-anchor blocks, to any anchor blocks preceding a run length above a pre-determined minimum length. In an improved embodiment, a pre-determined mapping between skip run length and relative QP change for the re-quantization is used. In a particular version, different pre-determined mappings are pre-computed for different image types, and the method ascertaining an image type and further includes selecting a pre-determined mapping from a set of pre-computed mappings for different image types according to the ascertained image type.

In yet another embodiment, a modified skip mode is introduced that allows for motion. By a zero-coded motion vector is meant a motion vector which is zero-valued—i.e., no motion between the macroblock and the corresponding macroblock in the relevant reference picture—or for which no data is coded other than an indication that the motion vector is to be decoded from one or more neighboring macroblocks' motion vector(s). For example, many coding methods are known for predictively encoding a motion vector from the motion vectors for neighboring macroblocks that are already determined. For a left to right, top to bottom order of encoding, the top left, top, top-right and same row left neighboring motion vectors may be known ahead of encoding of the current macroblock, and predictive differential coding may be used to code the current macroblock's motion vector by determining a predicted motion vector from the known neighboring macroblocks' motion vectors, and encoding the difference between the predicted motion vector and the motion vector determined by motion estimation. In one embodiment if the predicted motion vector is close enough to the motion vector in that residual image using the predicted motion vector for motion compensation is small enough, than no further bits are needed to code the motion vector other than an indication that the predicted motion vector is used. This also is a zero-coded motion vector. In one such embodiment, the ascertaining whether the block is a candidate for coding as skipped includes ascertaining whether the motion vectors for the block are zero-coded and whether the residual image is sufficiently small according to a smallness criterion. This allows for motion-vector prediction. Note that the inventors have found that in typical image sequences, it is rare that motion vector prediction leads to such well predicted motion for a large enough number of consecutive frames, so that the simpler code of only checking for no-motion, i.e., for zero-valued motion vector is used.

One embodiment applies one or more different criteria and one or more different parameters for different locations in a picture. In one embodiment, one or more of the following spatial variations are included:

The ascertaining of whether a block is a candidate for coding as skipped uses a closeness criterion that can vary according to the spatial locations of the macroblock in the frame.

The ascertaining of whether a block is a candidate for re-quantization can vary according to the spatial location of the macroblock in the image.

The mode determination method varies according to the spatial location of the block in the frame A rate controller is included, and the rate controller is operative QP as determined by the rate controller—Rate_control_quant—is a function of the location of the macroblock in the frame.

The relatively fine level of quantization used in the re-quantization is a function of the location of the macroblock in the frame.

Some embodiments include one of these features that vary according to the location of the macroblock in the image. Other embodiments include more than one of these features.

While the example embodiments described above are described for a single screen, single camera instance, the methods described herein can also be used for a system that includes a single screen and multiple cameras, a single camera and multiple screens, and multiple instances of a screen and of a camera.

Because the skip mode candidate selection includes ascertaining whether there is (a) zero valued motion vector(s), using such embodiments of the invention is particularly advantageous in for systems with stationary cameras, as in videoconferencing (see FIG. 2) and surveillance. The inventors have noticed that in a macroblock, distortion can be long-lived when the image content is created with a relatively high QP—meaning relatively coarse quantization, and then successive macroblocks are skipped.

Thus a method has been described for ensuring that macroblocks of background are encoded relatively efficiently with relatively high quantity.

In a video compression system, the bit-rate is typically limited. Many methods are known for rate control that allocate the bits to the parts of the picture that are most important, by varying the quantization across the blocks and across frames. One feature of a method embodiment of the invention is that the method can be used in addition to any other methods used to allocate different amounts of quantization to possibly further improve picture quality.

Another feature of the method described herein is that not only are parts of a frame improved, but so improving those parts of a frame can benefit the corresponding parts of future frames.

Note that in the description herein, details such as whether the video is color or monochrome is not described. Typically, the video includes color, such that three pictures: a luma picture and two chroma pictures are encoded. One embodiment uses only the luma image for mode selection, such that the method described herein is applied only to the luma picture blocks. In another embodiment, different quantization parameters are used to encode the luma and the chroma pictures.

The term coding and encoding are used interchangeably herein. Furthermore, progressing scanning is assumed, in which each frame is a single picture. How to modify the details for interlaced video would be straightforward to those in the art.

In one embodiment, a medium is encoded with computer-implemented instructions that when executed by one or more processors of a processing system, e.g., in an encoding system or sub-system cause the one or more encoding subsystem to carry out any of the methods described herein.

One embodiment is in the form of logic encoded in one or more tangible media for execution and when executed operable to carry out any of the methods describe herein. One embodiment is in the form of software encoded in one or more computer-readable media and when executed operable to carry out any of the methods described herein.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of the steps is implied, unless specifically stated.

The methodologies described herein are, in one embodiment, performable by one or more processors that accept computer-readable (also called machine-readable) logic encoded on one or more computer-readable tangible media in which are encoded a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD)

or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a medium in which are encoded a set of instructions, e.g., a computer program that are for execution on one or more processors, e.g., one or more processors that are part of an encoding system. Thus, as will be appreciated by those skilled in the art, embodiments of the present invention may be embodied as a method, an apparatus such as a special purpose apparatus, an apparatus such as a data processing system, or a medium, e.g., a computer program product. The computer-readable medium carries logic including a set of instructions that when executed on one or more processors cause the apparatus that includes the processor or processors to implement a method. Accordingly, aspects of the present invention may take the form of a method, an entirely hardware embodiment, an entirely software embodiment or an embodiment combining software and hardware aspects. Furthermore, the present invention may take the form of medium (e.g., a computer program product on a computer-readable storage medium) carrying computer-readable program code embodied in the medium.

While a medium is shown in an example embodiment to be a single medium, the term "medium" should be taken to include a single medium or multiple media (e.g., a centralized or distributed database, and/or associated caches and servers) that store the one or more sets of instructions. The term "medium" shall also be taken to include any medium that is capable of storing, encoding a set of instructions for execution by one or more of the processors and that cause the one or more processors to perform any one or more of the methodologies of the present invention. A medium may take many forms, including tangible storage media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. For example, the term "medium" shall accordingly be taken to included, but not be limited to, solid-state memories, a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

It should further be appreciated that although the invention has been described in the context of H.264/AVC, the invention is not limited to such contexts and may be utilized in various other applications and systems, for example in a system that uses MPEG-2 or other compressed media streams, whether conforming to a published standard or not Furthermore, the invention is not limited to any one type of network architecture and method of encapsulation, and thus may be utilized in conjunction with one or a combination of other network architectures/protocols.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
for at least one block of a picture of a time sequence of pictures, in an encoding method that includes: partitioning the picture into blocks of pixel values; predicting the block pixel values from the pixel values of a corresponding block in one or more reference pictures, the predicting including compensating for motion according to one or more motion vector values; determining the pixel values of a residual block indicative of the difference between the block pixel values and the predicted block pixel values; transforming the residual block to form transform coefficients for the residual block; and quantizing the transform coefficients:
ascertaining whether the block is a candidate for coding as skipped;
for a block that has been coded as skipped, keeping track of how long the block has been coded as skipped in successive pictures of the time sequence,
ascertaining whether or not the block is a candidate for re-quantization from a level of quantization according to a re-quantization criterion;
for one or more of the blocks that are candidates for re-quantization, re-setting the level of quantization of the blocks to a relatively fine level of quantization; and
for any block that is ascertained to be a candidate for coding as skipped and whose level of quantization is not re-set, coding the block as skipped,
such that after some pre-defined amount of time of being coded as skipped, the quantization level for a block coded as skipped is re-set to the relatively fine level of quantization.

2. A method as recited in claim 1, wherein the ascertaining whether or not the block is a candidate for re-quantization is independent of the result of the ascertaining of whether the block is a candidate for coding as skipped.

3. A method as recited in claim 1, wherein the ascertaining whether the block is a candidate for coding as skipped includes ascertaining whether the one or more motion vectors for the block are zero valued and whether the residual image is sufficiently small according to a smallness criterion.

4. A method as recited in claim 1, wherein the ascertaining whether the block is a candidate for coding as skipped includes ascertaining whether the one or more motion vectors are zero-coded and whether the residual image is sufficiently small according to a smallness criterion.

5. A method as recited in claim 3, wherein the ascertaining of whether the residual image is sufficiently small according to the smallness criterion smallness criterion includes comparing one or more pre-defined functions of the residual image to one or more respective pre-defined thresholds.

6. A method as recited in claim 1, wherein in any picture at most a pre-determined number of blocks can be candidates for re-quantization.

7. A method as recited in claim 6, wherein for any picture, the ascertaining of whether the block is a candidate for re-quantization includes ascertaining only for blocks that are in one or more particular columns of the picture to be candidates for re-quantization.

8. A method as recited in claim 1, wherein for a particular block, the keeping track includes maintaining a count of the number of pictures for which the block has been coded as skipped, and wherein the re-quantization criterion for the particular block is that the block has been skipped for at least a pre-determined number of pictures.

9. A method as recited in claim 1, wherein the encoding method is operative to produce a bitstream that is sent to a remote decoder, wherein the remote decoder is operative to send feedback to the encoding method when an error is detected at the decoder, and wherein the encoding method is operative to encode frames using inter prediction with reference to a long-term reference frame rather than a recent frame to encode a frame such that relatively long sequences of frames are inter-predicted compared to not sending back the feedback from the decoder.

10. A method as recited in claim 1, wherein the relatively fine level of quantization is dependent on the location of the block in the picture.

11. A method as recited in claim 1, wherein the ascertaining of whether the block is a candidate for coding as skipped occurs prior to and without requiring coding the block.

12. A method as recited in claim 11, wherein the ascertaining of whether the block is a candidate for coding as skipped occurs as part of mode selection for the block, wherein the mode selection occurs prior to and without requiring coding the block.

13. A method comprising:
selecting the mode for coding a block in a picture of a time sequence of pictures, one of the modes being inter coding according to a quantization level, and one of the modes being to code the block as skipped, selecting the mode including ascertaining whether or not a block is to be coded in a mode other than coded as skipped;
ascertaining of whether or not the block is a candidate for re-quantization;
coding the block,
wherein one or both:
that the ascertaining whether or not a block is to be coded as skipped occurs independent of the ascertaining of whether or not the block is to be coded in a mode other than coded as skipped, and
that at most a pre-defined number of blocks of the picture are subject to the re-setting of the quantization level in any one picture of the sequence of pictures, such that the number of consecutive times that a particular block is coded as skipped without re-setting the quantization level to a relatively fine level of quantization and re-selecting the mode is limited to a pre-defined limit.

14. A method as recited in claim 13, wherein the ascertaining whether or not a block is to be coded as skipped occurs independent of the ascertaining of whether or not the block is to be coded in a mode other than coded as skipped.

15. A method as recited in claim 13, wherein at most a pre-defined number of blocks of the picture are subject to the re-setting of the quantization level in any one picture of the sequence of pictures.

16. A non-transitory computer-readable medium encoding executable instructions that when executed by one or more processors of a processing system carry out a method comprising:
for at least one block of a picture of a time sequence of pictures, in an encoding method that includes: partitioning the picture into blocks of pixel values; predicting the block pixel values from the pixel values of a corresponding block in one or more reference pictures, the predicting including compensating for motion according to one or more motion vector values; determining the pixel values of a residual block indicative of the difference between the block pixel values and the predicted block pixel values; transforming the residual block to form transform coefficients for the residual block; and quantizing the transform coefficients:

ascertaining whether the block is a candidate for coding as skipped;
for a block that has been coded as skipped, keeping track of how long the block has been coded as skipped in successive pictures of the time sequence,
ascertaining whether or not the block is a candidate for re-quantization from a level of quantization according to a re-quantization criterion;
for one or more of the blocks that are candidates for re-quantization, re-setting the level of quantization of the blocks to a relatively fine level of quantization; and
for any block that is ascertained to be a candidate for coding as skipped and whose level of quantization is not re-set, coding the block as skipped, such that after some pre-defined amount of time of being coded as skipped, the quantization level for any block coded as skipped is re-set to the relatively fine level of quantization.

17. A non-transitory computer-readable medium as recited in claim 16, wherein the ascertaining whether the block is a candidate for coding as skipped includes ascertaining whether the motion vectors for the block are zero-valued and whether the quantized residual image is sufficiently small according to a smallness criterion.

18. A non-transitory computer-readable medium as recited in claim 16, wherein in any picture at most a pre-determined number of blocks can be candidates for re-quantization.

19. A non-transitory computer-readable medium as recited in claim 16, wherein for a particular block, the keeping track includes maintaining a count of the number of pictures for which the block has been coded as skipped, and wherein the re-quantization criterion for the particular block is that the block has been skipped for at least a pre-determined number of pictures.

20. An apparatus comprising:
a mode selector operative to select the mode for encoding a block of a picture of a sequence of pictures, the selecting of a mode being from one or more intra coding modes and one or more inter coding modes, inter coding including determining a residual image, transforming the residual image, and quantizing the transformed residual image to form quantized transform coefficients, the modes including a mode in which the block is coded as skipped, a block coded as skipped being a block for which in inter coding, all motion vectors for the block are zero-valued and the residual image is sufficiently small according to a smallness criterion; and
an encoder to code the block according to the selected mode,
wherein the mode selector and encoder are operative to:
ascertain whether the block is a candidate for coding as skipped;
for a block that has been coded as skipped, keep track of how long the block has been coded as skipped in successive pictures of the time sequence,
ascertain whether or not the block is a candidate for re-quantization from a level of quantization according to a re-quantization criterion;
for one or more of the blocks that are candidates for re-quantization, re-set the level of quantization of the blocks to a relatively fine level of quantization; and
for any block that is ascertained to be a candidate for coding as skipped and whose level of quantization is not re-set, code the block as skipped,
such that after some pre-defined amount of time of being coded as skipped, the quantization level for any block coded as skipped is re-set to the relatively fine level of quantization.

* * * * *